United States Patent
Houde et al.

[19]

[11] Patent Number: 6,128,481
[45] Date of Patent: Oct. 3, 2000

[54] SYSTEM AND METHOD OF ROUTING EMERGENCY SERVICES CALLS IN A RADIO TELECOMMUNICATIONS NETWORK

[75] Inventors: Michel Houde, St-Laurent, Canada; Gustavo Pavón, Garland, Tex.

[73] Assignee: Telefonaktiebolaget L M Ericsson (publ), Stockholm, Sweden

[21] Appl. No.: 08/956,085

[22] Filed: Oct. 22, 1997

[51] Int. Cl.[7] .................. G01S 1/08; H04B 7/15; H04B 1/00; H04M 11/00

[52] U.S. Cl. .................. 455/404; 455/445; 455/456; 455/560

[58] Field of Search .................. 455/404, 445, 455/560, 456, 432, 435, 458; 379/207, 211, 220, 229, 230, 45, 49

[56] References Cited

U.S. PATENT DOCUMENTS

| | | | |
|---|---|---|---|
| 4,654,481 | 3/1987 | Corris et al. | 379/62 |
| 5,343,493 | 8/1994 | Karimullah | 375/1 |
| 5,388,147 | 2/1995 | Grimes | 379/59 |
| 5,768,686 | 6/1998 | LeBlanc et al. | 455/31.1 |
| 5,797,093 | 8/1998 | Houde | 455/404 |
| 5,805,688 | 9/1998 | Gillespie et al. | 379/220 |

*Primary Examiner*—Daniel S. Hunter
*Assistant Examiner*—Meless Zewdu
*Attorney, Agent, or Firm*—Smith & Danamraj, P.C.

[57] ABSTRACT

A system and method for routing an emergency services call from a mobile station to a selected Public Safety Answering Point (PSAP) in a radio telecommunications network. The system intelligently selects the PSAP from a plurality of PSAPs, warns the selected PSAP that the emergency services call is coming prior to routing the call to the selected PSAP, and provides the selected PSAP with advanced information regarding the context of the call. The emergency services call is received by a serving mobile switching center (MSC) which determines that the call is an emergency services call and sends cell or sector information to a service control point (SCP). The SCP includes a PSAP selector which selects the PSAP based on such information as, for example, the location of the mobile station, the Local Access and Traffic Area (LATA) in which the mobile station is located, the time-of-day, and the day-of-week. The SCP then sends an alerting signal to the selected PSAP and includes a tag and information relating to the context of the call. The SCP then returns the tag and the identity of the selected PSAP to the serving MSC which determines the PSAP routing number and delivers the call to the selected PSAP.

23 Claims, 3 Drawing Sheets

SYSTEM AND METHOD OF ROUTING EMERGENCY SERVICES CALLS IN A RADIO TELECOMMUNICATIONS NETWORK

BACKGROUND OF THE INVENTION

1. Technical Field of the Invention

This invention relates to radio telecommunication systems and, more particularly, to a system and method of routing emergency service (e.g., 9-1-1) calls from a mobile station to a Public Safety Answering Point (PSAP).

2. Description of Related Art

In existing radio telecommunications networks, there are several methods of routing emergency services calls (for example, 9-1-1 calls) initiated by a mobile subscriber to the appropriate PSAP. The appropriate PSAP may be determined, for example, based on time-of-day and/or geographic considerations. For example, an emergency call from a mobile station traveling on a highway may be routed to different PSAPs, depending on the location of the MS. In addition, some PSAPs may be operational only during certain hours.

FIG. 1 is a message flow diagram illustrating a first existing method of routing emergency calls in deployed cellular networks. When a mobile station 11 originates an emergency call at 12, the serving mobile switching center (MSC) 13 performs an analysis at 14 of the called number and determines that the call is an emergency services call. The serving MSC then determines an approximate location of the mobile station based, for example, on the location of the serving cell or sector. An appropriate PSAP 15 is then selected, based on either location or time-of-day, and a trunk is established to the selected PSAP at 16. However, other factors which could influence the choice of PSAP are not considered, and the PSAP has no advanced warning that the call is coming.

FIG. 2 is a message flow diagram illustrating a second existing method of routing emergency calls in deployed cellular networks. TIA/EIA/PN3581 (J-STD-034), which is hereby incorporated by reference herein, utilizes a selective router node 21 in the cellular network. The selective router 21 may be located outside the serving MSC and is typically located outside of any associated home location register (HLR). When the mobile station 11 originates an emergency call at 22, the serving MSC 13 performs an analysis of the called number at 23, and determines that the call is an emergency services call. The serving MSC then determines an approximate location of the mobile station. A call setup signaling message 24 is then utilized to provide the selective router 21 with routing digits which identify the cell or sector where the calling mobile station 11 is located. In Phase I of J-STD-034 implementation, the granularity of the location information is defined down to the cell or sector level. In Phase 2 of J-STD-034 implementation, the granularity of the location information will be defined down to 125 meters, 65 percent of the time, in both the X and Y directions.

The selective router 21 then identifies the PSAP 15 which corresponds to the identified cell or sector at 25, and a trunk is established to the selected PSAP at 26. However, factors other than location which could influence the choice of PSAP are not considered, and the PSAP has no advanced warning that the call is coming.

In order to overcome the disadvantage of existing solutions, it would be advantageous to have a system and method of routing an emergency services call which provides an intelligent choice of PSAPs, warns the PSAP that an emergency call is coming, and provides the PSAP with advanced information regarding the context of the call.

Although there are no known prior art teachings of a solution to the aforementioned deficiency and shortcoming such as that disclosed herein, U.S. Pat. No. 5,239,570 to Koster et al. (Koster) and U.S. Pat. No. 5,598,460 to Tendler (Tendler) discuss subject matter that bears some relation to matters discussed herein. Koster discloses a 9-1-1 switched access system in which shared lines are made as reliable as dedicated lines. Thus, Koster does not teach or suggest a method of routing an emergency services call which provides an intelligent choice of PSAPs, warns the PSAP that an emergency call is coming, and provides the PSAP with advanced information regarding the context of the call.

Tendler discloses a system for enhancing the reliability of rescue services by providing a 9-1-1 back-up system in which the termination of an emergency call is sensed, followed by dialing the telephone number of a predetermined dispatch office. The dispatch office then calls back the nearest PSAP to ascertain whether or not rescue personnel are on their way. Thus, Tendler does not teach or suggest a method of routing an emergency services call which provides an intelligent choice of PSAPs, warns the PSAP that an emergency call is coming, and provides the PSAP with advanced information regarding the context of the call.

Review of each of the foregoing references reveals no disclosure or suggestion of a system or method such as that described and claimed herein.

SUMMARY OF THE INVENTION

In one aspect, the present invention is a method of routing an emergency services call from a mobile station to a selected Public Safety Answering Point (PSAP) in a radio telecommunications network. The method includes intelligently selecting the PSAP from a plurality of PSAPs, warning the selected PSAP that the emergency services call is coming prior to routing the call to the selected PSAP, and providing the selected PSAP with advanced information regarding the context of the call.

In another aspect, the present invention is a system for routing an emergency services call from a mobile station to a selected Public Safety Answering Point (PSAP) in a radio telecommunications network. The system comprises means for intelligently selecting the PSAP from a plurality of PSAPs, means for warning the selected PSAP that the emergency services call is coming prior to routing the call to the selected PSAP, and means for providing the selected PSAP with advanced information regarding the context of the call. The means for intelligently selecting the PSAP from a plurality of PSAPs may include a PSAP selector which selects the PSAP based on such information as, for example, the location of the mobile station, the Local Access and Traffic Area (LATA) in which the mobile station is located, the time-of-day, and the day-of-week.

BRIEF DESCRIPTION OF THE DRAWINGS

The invention will be better understood and its numerous objects and advantages will become more apparent to those skilled in the art by reference to the following drawing, in conjunction with the accompanying specification, in which.

DETAILED DESCRIPTION OF EMBODIMENTS

Figure 1:
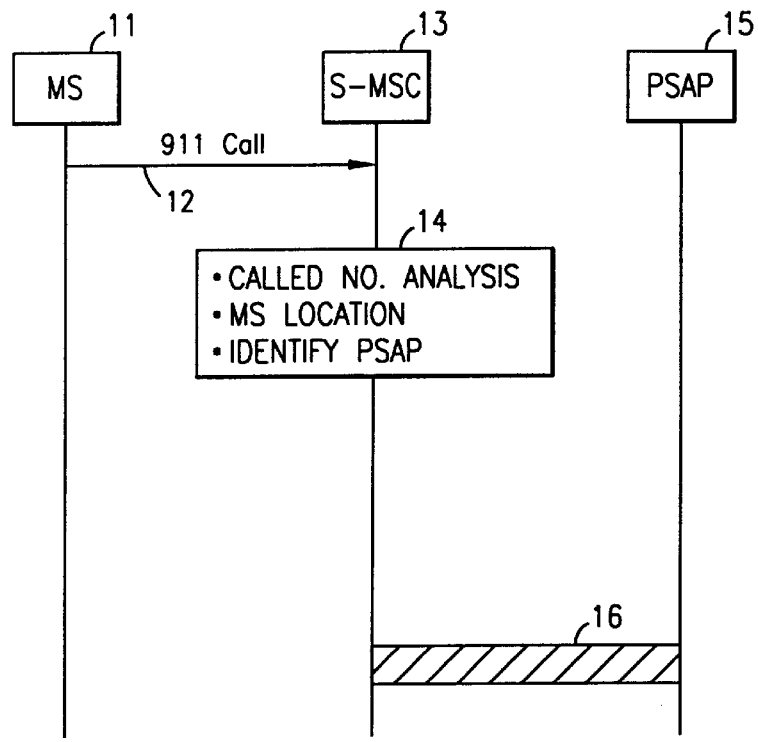
FIG. 1 (Prior Art) is a message flow diagram illustrating a first existing method of routing emergency calls in deployed cellular networks.
Figure 2:
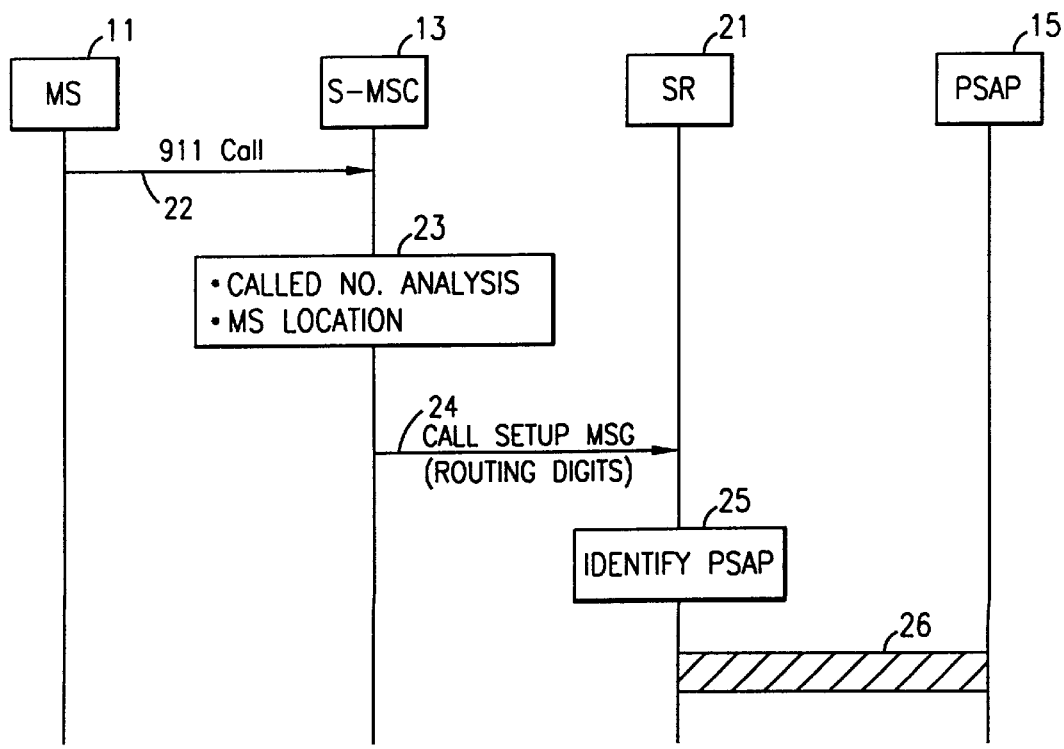
FIG. 2 (Prior Art) is a message flow diagram illustrating a second existing method of routing emergency calls in deployed cellular networks.
Figure 3:
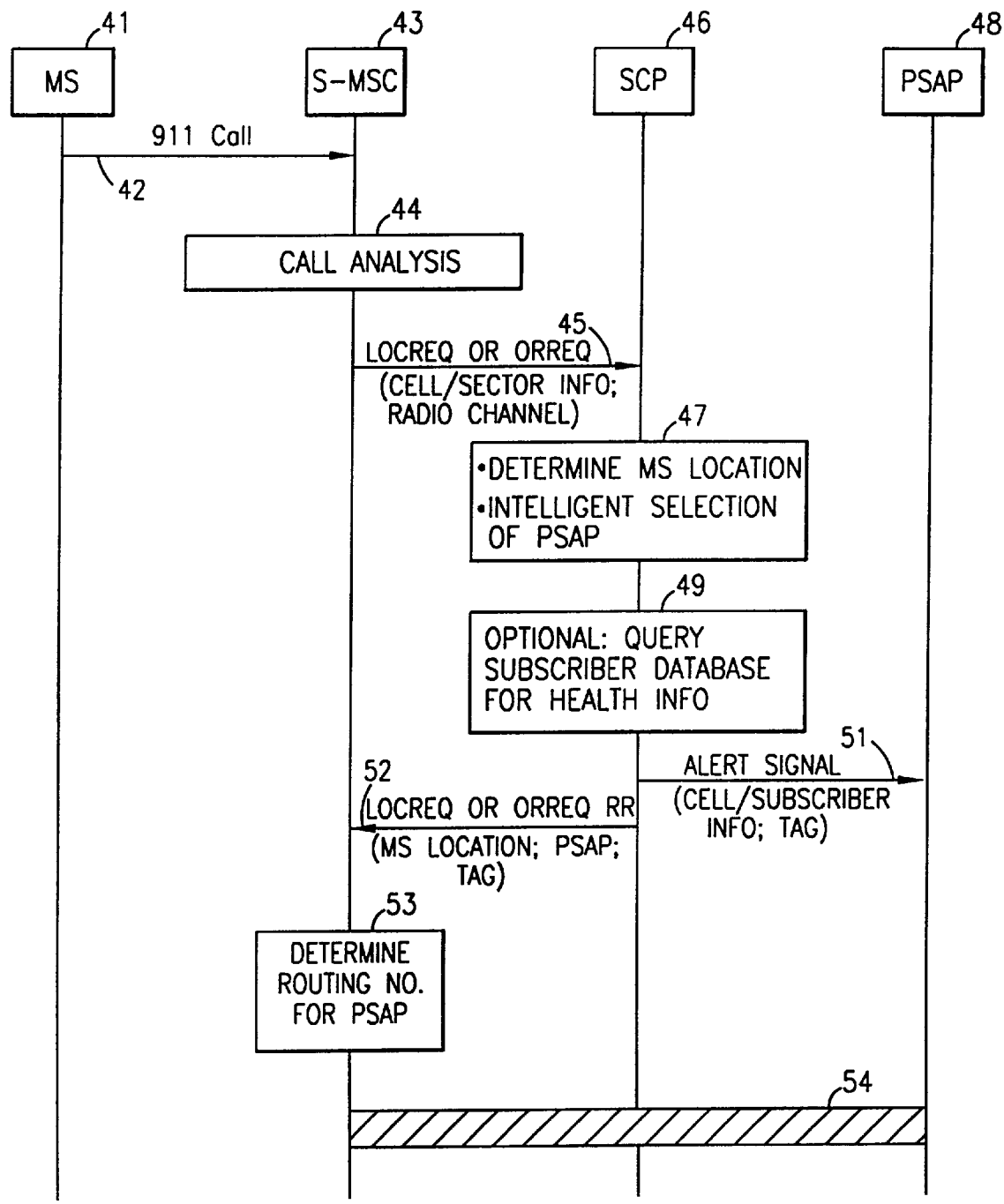
FIG. 3 is a message flow diagram illustrating the routing of emergency calls in a cellular network in accordance with the teachings of the present invention.

FIG. 3 is a message flow diagram illustrating the routing of emergency calls in a cellular network in accordance with the teachings of the present invention. A mobile station 41 originates an emergency call at 42. The mobile station may include an indication in the message sent over the air interface that the call is an emergency services call. A serving MSC 43 then determines that the call is an emergency services call at 44 in one of several ways. The serving MSC may perform an analysis of the called number, the MSC may receive an indication via the air interface from the mobile station, or by other means. The serving MSC then sends a message 45 such as, for example, a location request (LOCREQ) Invoke message, an origination request (ORREQ) Invoke message, or another message dedicated for this purpose to an SCP 46. The serving MSC adds parameters identifying refined cell or sector information or the latitude and longitude coordinates of the calling mobile station 41, as well as the analog voice channel or digital traffic channel by which the mobile station is served. The SCP 46 recognizes the call as an emergency services call because (1) SCPs do not normally receive LOCREQ messages, (2) the presence of the mobile station parameters and cell location parameters in the message 45, (3) the usage of the dedicated message, or (4) by recognizing the digits 9-1-1 in the DialedDigits parameter of the LOCREQ or ORREQ messages.

If the SCP 46 has received refined cell or sector information from the serving MSC, the SCP then utilizes this information and internal service logic at 47 to determine the mobile station location. Otherwise, the SCP utilizes the received mobile station location information and internal mapping functions to determine the appropriate PSAP 48. The choice of PSAP may be based on a number of factors including, for example, the mobile station location, the mobile station telephone number, the health status of the mobile station's subscriber, the Local Access and Traffic Area (LATA) in which the mobile station is located, the time-of-day, and day-of-week. Additional factors may also be considered. Information such as the health status of the mobile station's subscriber may optionally be obtained by the SCP at 49 by querying a subscriber database in which critical health conditions such as epilepsy or heart conditions may be recorded. The SCP may then send an alert signal 51 to the selected PSAP 48. The alert signal warns the PSAP that the call is coming, and includes a tag for the call, and further information about the call and the subscriber. The SCP 46 then sends a Return Result message 52 (LOCREQ, ORREQ, or other message, as appropriate) to the serving MSC 43 and includes the tag along with the mobile station location and the identity of the selected PSAP 48. The serving MSC performs a called number analysis at 53 and determines the routing number for the PSAP 48 identified by the SCP, and then connects a trunk at 54 to the PSAP.

The present invention provides an intelligent choice of PSAPs for routing the call. Additionally, the invention sends an alert signal to the selected PSAP warning the PSAP that an emergency call is coming. The invention also provides the PSAP with advanced information regarding the context of the call.

Figure 4:
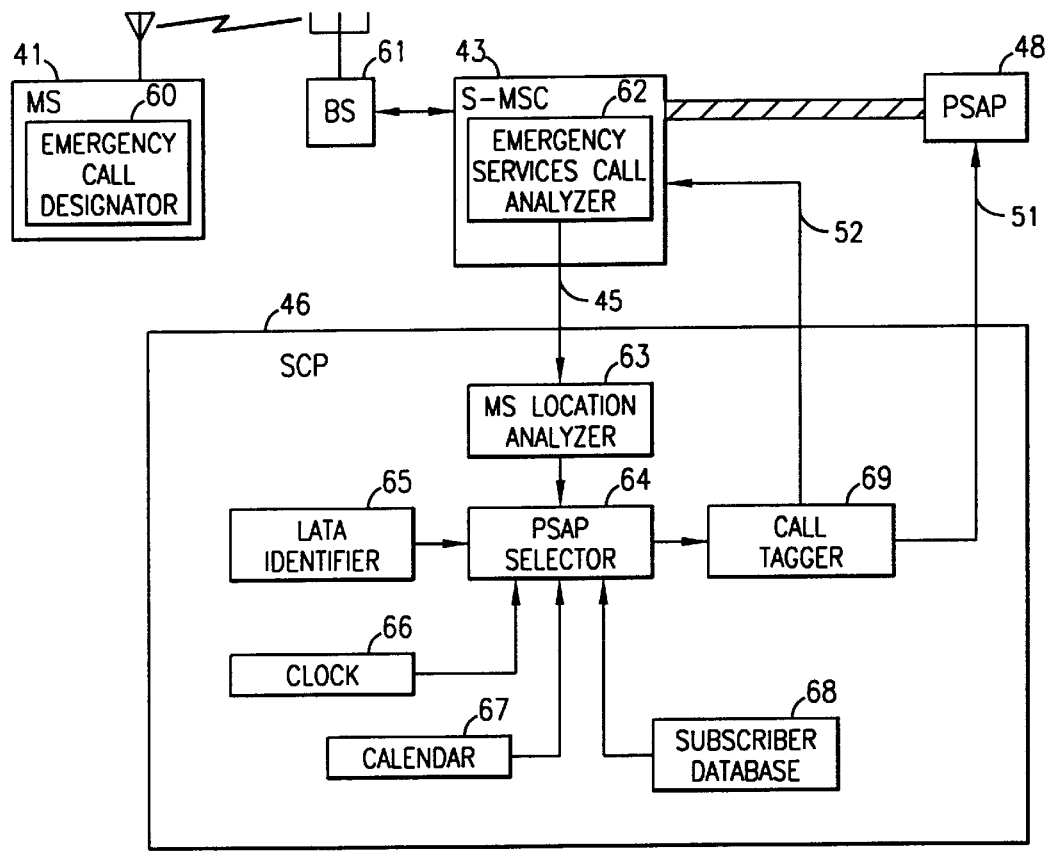
FIG. 4 is a simplified block diagram of the system of the present invention.

FIG. 4 is a simplified block diagram of the system of the present invention. With reference to FIGS. 3 and 4, the mobile station 41 may place an emergency call via radio signals to a base station 61 which is connected to the serving MSC 43. An emergency call designator 60 includes an indication that the call is an emergency services call. The serving MSC includes an emergency services call analyzer 62 which may be, for example, a called number analyzer, a receiver that receives the indication from the mobile station that the call is an emergency services call, or other call analyzer. The serving MSC then sends the LOCREQ, ORREQ, or other Invoke message 45 to the SCP 46 with the parameters identifying refined cell or sector information of the calling mobile station 41 as well as the analog voice channel or digital traffic channel by which the mobile station is served. This information is received in the SCP and passed to a mobile station location analyzer 63 and an intelligent PSAP selector 64.

The intelligent PSAP selector 64 also receives inputs from a LATA identifier 65, a time-of-day clock 66, a day-of-week calendar 67, and a subscriber database 68. The subscriber database 68 may include information such as the health status of the calling party. The SCP then generates the alert signal 51 which is sent to the selected PSAP 48. A call tagger 69 places a tag identifying the call in the alert signal. The SCP 46 then sends a Return Result message 52 (LOCREQ, ORREQ, or other message, as appropriate) to the serving MSC 43.

It is thus believed that the operation and construction of the present invention will be apparent from the foregoing description. While the method, apparatus and system shown and described has been characterized as being preferred, it will be readily apparent that various changes and modifications could be made therein without departing from the spirit and scope of the invention as defined in the following claims.

What is claimed is:

1. A method of routing an emergency services call from a mobile station to a selected Public Safety Answering Point (PSAP) in a radio telecommunications network, said method comprising the steps of:

intelligently selecting the PSAP from a plurality of PSAPs;

sending an alert signal to the selected PSAP prior to routing the call to the selected PSAP, said alert signal warning the PSAP that the emergency services call is coming and providing the PSAP with advanced information regarding the context of the call; and routing the call to the selected PSAP.

2. The method of routing an emergency services call of claim 1 wherein said step of intelligently selecting the PSAP from a plurality of PSAPs includes selecting the PSAP based on the location of the mobile station.

3. The method of routing an emergency services call of claim 2 wherein said step of intelligently selecting the PSAP based on the location of the mobile station includes selecting the PSAP based on the Local Access and Traffic Area (LATA) in which the mobile station is located.

4. The method of routing an emergency services call of claim 1 wherein said step of intelligently selecting the PSAP from a plurality of PSAPs includes selecting the PSAP based on the time-of-day and day-of-week.

5. The method of routing an emergency services call of claim 1 wherein said step of intelligently selecting the PSAP from a plurality of PSAPs includes the steps of:

receiving the emergency services call in a serving mobile switching center (MSC);

informing a service control point (SCP) that the received call is an emergency services call;

determining the location of the mobile station; and selecting the PSAP in the SCP.

6. The method of routing an emergency services call of claim 5 wherein said step of informing a service control point (SCP) that the received call is an emergency services call includes sending a location request (LOCREQ) message to the SCP.

7. The method of routing an emergency services call of claim 5 wherein said step of informing a service control point (SCP) that the received call is an emergency services call includes sending a dedicated message for informing the SCP that the received call is an emergency services call, said dedicated message including mobile station parameters and location parameters for said mobile station.

8. The method of routing an emergency services call of claim 5 wherein said step of informing a service control point (SCP) that the received call is an emergency services call includes sending a message to the SCP which includes a parameter indicating the digits dialed.

9. The method of routing an emergency services call of claim 5 wherein said step of selecting the PSAP in the SCP includes selecting the PSAP based on the location of the mobile station, the Local Access and Traffic Area (LATA) in which the mobile station is located, the time-of5 day, and the day-of-week.

10. The method of routing an emergency services call of claim 5 wherein said step of sending an alert signal to the selected PSAP prior to routing the call to the selected PSAP includes sending an alert signal from the SCP to the selected PSAP before notifying the serving MSC of the identity of the selected PSAP.

11. The method of routing an emergency services call of claim 10 wherein said step of sending an alert signal to the selected PSAP prior to routing the call includes sending a tag identifying the call and information relating to the context of the call in the alert signal sent from the SCP to the selected PSAP.

12. The method of routing an emergency services call of claim 11 wherein said step of sending a tag identifying the call and information relating to the context of the call includes sending health information of the mobile station's subscriber in the alert signal.

13. A method of routing an emergency services call from a mobile station to a selected Public Safety Answering Point (PSAP) in a radio telecommunications network, said method comprising the steps of:

transmitting the emergency services call from the mobile station to a serving mobile switching center (S-MSC);

determining in said S-MSC that the call is an emergency services call;

sending a first message from the S-MSC to a service control point (SCP), said first message including mobile station parameters and location parameters for said mobile station;

intelligently selecting the PSAP in the SCP;

sending an alert signal from the SCP to the selected PSAP, the alert signal including a tag identifying the call and information relating to the context of the call;

sending a second message from the SCP to the S-MSC, said second message including an identity of the selected PSAP and the tag identifying the call;

determining in the S-MSC, a routing number for the selected PSAP; and delivering the call from the S-MSC to the selected PSAP.

14. A system for routing an emergency services call from a mobile station to a selected Public Safety Answering Point (PSAP) in a radio telecommunications network, said system comprising:

means for intelligently selecting the PSAP from a plurality of PSAPs;

means for sending an alert signal to the selected PSAP prior to routing the call to the selected PSAP, said alert signal warning the PSAP that the emergency services call is coming and providing the PSAP with advanced information regarding the context of the call; and means for routing the call to the selected PSAP.

15. The system for routing an emergency services call of claim 14 wherein said means for intelligently selecting the PSAP from a plurality of PSAPs includes a PSAP selector which selects the PSAP based on the location of the mobile station.

16. The system for routing an emergency services call of claim 15 wherein said PSAP selector which selects the PSAP based on the location of the mobile station selects the PSAP based on the Local Access and Traffic Area (LATA) in which the mobile station is located.

17. The system for routing an emergency services call of claim 14 wherein said means for intelligently selecting the PSAP from a plurality of PSAPs includes a PSAP selector which selects the PSAP based on the time-of-day and day-of-week.

18. The system for routing an emergency services call of claim 14 wherein said means for intelligently selecting the PSAP from a plurality of PSAPs includes:

a serving mobile switching center (MSC) which receives the emergency services call from the mobile station;

means within said serving MSC for informing a service control point (SCP) of the cell in which the call originated;

means within said SCP for determining the location of the mobile station; and means within said SCP for selecting the PSAP.

19. The system for routing an emergency services call of claim 18 wherein said means within said SCP for selecting the PSAP includes a PSAP selector which selects the PSAP based on the location of the mobile station, the Local Access and Traffic Area (LATA) in which the mobile station is located, the time-of-day, and the day-of-week.

20. The system for routing an emergency services call of claim 18 wherein said means for warning the selected PSAP that the emergency services call is coming prior to routing the call to the selected PSAP includes means for sending an alert signal from the SCP to the selected PSAP before notifying the serving MSC of the identity of the selected PSAP.

21. The system for routing an emergency services call of claim 20 wherein said means for providing the selected PSAP with advanced information regarding the context of the call includes means for sending a tag identifying the call and information relating to the context of the call in the alert signal sent from the SCP to the selected PSAP.

22. The system for routing an emergency services call of claim 21 wherein said means for sending a tag identifying the call and information relating to the context of the call includes:

means for retrieving subscriber health information from a subscriber database; and means for sending health information of the mobile station's subscriber in the alert signal.

23. A system for routing an emergency services call from a mobile station to a selected Public Safety Answering Point (PSAP) in a radio telecommunications network, said system comprising:

a serving mobile switching center (S-MSC) which receives the emergency services call from the mobile station, said S-MSC including an emergency services call analyzer which determines that the call is an emergency services call and informs a service control point (SCP) of the cell in which the call originated;

a SCP connected to the S-MSC, said SCP including:
   a mobile station location analyzer for determining the location of the mobile station;
   an intelligent PSAP selector which intelligently selects the PSAP, sends an alert signal from the SCP to the selected PSAP prior to routing the call, and sends a message to the S-MSC identifying the selected PSAP; and
   a call tagger which places a tag identifying the call in the alert signal and in the message to the S-MSC identifying the selected PSAP; and means for delivering the emergency services call from the S-MSC to the selected PSAP.

* * * * *

UNITED STATES PATENT AND TRADEMARK OFFICE
CERTIFICATE OF CORRECTION

PATENT NO. : 6,128,481
DATED : October 3, 2000
INVENTOR(S) : Michel Houde and Gustavo Pavon It is certified that error appears in the above-identified patent and that said Letters Patent are hereby corrected as shown below:

Column 5, line 26, delete "time-of5 day" and substiture -- time-of-day -- therefor.

Signed and Sealed this

Twenty-fourth Day of April, 2001

Attest:

NICHOLAS P. GODICI

Attesting Officer

Acting Director of the United States Patent and Trademark Office